Nov. 25, 1930.  J. DELATTRE-SEGUY  1,782,810
PROCESS AND APPARATUS FOR DISTILLING LIQUIDS
Filed June 28, 1926
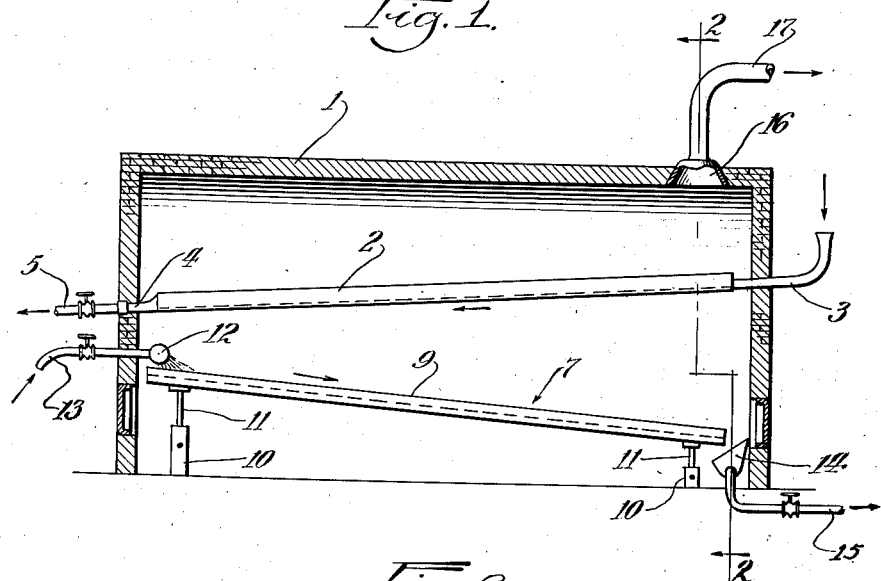
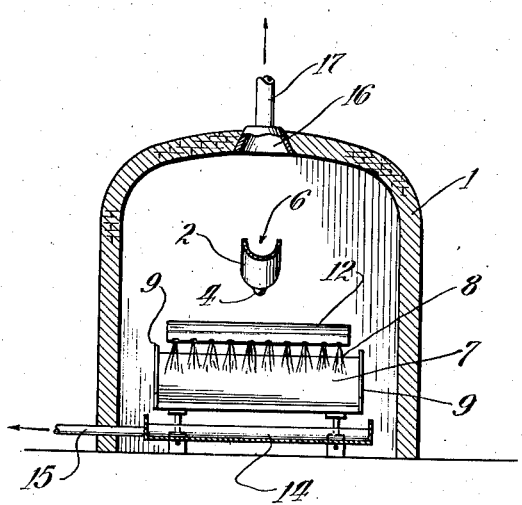

Patented Nov. 25, 1930

1,782,810

UNITED STATES PATENT OFFICE

JEAN DELATTRE-SEGUY, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROCESS AND APPARATUS FOR DISTILLING LIQUIDS

Application filed June 28, 1926. Serial No. 118,981.

This invention relates to improvements in process and apparatus for distilling liquids, and refers more particularly to distilling the liquids by the application of reflected and radiated heat to a relatively thin film of liquid suitably supported in the heating chamber.

In order to more clearly understand the invention, I shall describe the process with reference to some particular use, as for example, the cracking of petroleum oil at atmospheric pressure. In its broader aspects, the invention is in no sense limited to such use.

In the drawings, Fig. 1 is a more or less longitudinal vertical sectional view of my apparatus.

Fig. 2 is a transverse sectional view of the same.

Referring to the drawings, 1 designates a heating chamber, in the upper portion of which is mounted a trough 2, which may be made of carborundum, brick or the like. The inlet side is connected to the pipe 3 which may be made of similar material, and its outlet side connects with the pipe 4 leading to any suitable source, as for example, the discharge pipe 5 from which it is discharged. The trough is open at the top as shown at 6 in Fig. 2, and the molten metal used, may be for instance, molten lead, molten glass, or the like. Below the trough is mounted an inclined plate 7 consisting of a flat bottom portion 8 and side walls 9, the arrangement being such as to form a shallow wide channel. The plate is mounted on standards 10 carrying jacks 11 whereby the slope of the plate may be varied as desired. The oil to be treated is fed to the upper end of the plate through the transversely extending perforated nozzle 12 connected to feed pipe 13 leading to any suitable source of supply. The lower end of the plate delivers the residue into the transversely extending wide funnel 14, to which is connected the residue drawoff 15 leading to any suitable storage, or elsewhere. The vapors pass out of the heating chamber through the vapor collector dome 16, vapor outlet pipe 17, the latter leading either to a condenser, or to some collecting place for the vapors, which may be further treated before being condensed.

In carrying out the invention, for example, in the cracking of petroleum oil, fuel oil may be fed in a relatively thin film over the inclined plate and will be distilled by the radiated or deflected heat from the hot molten mass in the trough. The oil may be heated to a temperature of 900° F. or more, and the inclination of the plate will be so regulated as to keep the oil within the furnace the necessary time as to insure the necessary vaporization. It is to be understood, that while I have illustrated the invention as applied to cracking petroleum oil, the process is not necessarily limited thereto.

Many of the petroleum oils which are cracked, contain objectionable sulphur compounds which remain in the vapors after cracking, as well as in the residue. By causing the vapors to pass over the molten bath, as for example, a lead bath, reactions may occur which may cause the sulphur to be separated from the oil vapors in the form of lead sulphide. In its broader aspects, it may be desirable to use such a molten bath, as will tend to cause other chemical reactions. The molten bath in such apparatus not only tends to cause a specific chemical reaction, but also to heat the oil for distillation.

I claim as my invention:

1. A process of distilling hydrocarbon oil, consisting in passing the liquid to be distilled in a relatively wide shallow stream over an inclined plate and simultaneously heating the upper surface of such film by heat radiated from a hot molten bath.

2. In an apparatus for treating hydrocarbon oil, the combination with a heating chamber, of a trough for receiving hot molten liquid, extending therethrough, and an inclined plate having side walls mounted below the trough, and means for varying the degree of slope of such plate, means for feeding the oil to the upper end of said inclined plate, means for drawing off the vapors, and means for removing the residue.

3. A process of distilling hydrocarbon oils, consisting in passing the liquid in one end of a chamber and permitting it to gravitate in a relatively wide shallow stream towards the other end of the chamber, and simultaneously heating the upper surface of said film by heat radiated by passing a stream of molten, normally solid material in the other end of said chamber and permitting it to gravitate toward the first end thereof.

4. A process of distilling and desulphurizing hydrocarbon oils which comprises flowing the oil in a relatively thin film through a distillation zone, simultaneously heating the upper surface of the film by heat radiated from a hot molten metal, and permitting evolved vapors to contact with said molten metal.

5. A process of distilling hydrocarbon oils which comprises flowing the oil by gravity in a relatively thin film through a distillation zone and simultaneously applying a distillation heat solely to the upper surface of said film by heat radiated from a hot molten bath.

JEAN DELATTRE-SEGUY.